United States Patent
Hopp et al.

(10) Patent No.: US 11,801,175 B2
(45) Date of Patent: Oct. 31, 2023

(54) MULTI-POSITION AIRFLOW CONTROL ASSEMBLY FOR AN AIR CUSHION

(71) Applicant: PERMOBIL, INC., Lebanon, TN (US)

(72) Inventors: David Hopp, Edwardsville, IL (US); Kevin Meier, St. Louis, MO (US); Ross Peyton, O'Fallon, IL (US); Steven DuFresne, Hartland, WI (US)

(73) Assignee: PERMOBIL, INC., Lebanon, TN (US)

( * ) Notice: Subject to any disclaimer, the term of this patent is extended or adjusted under 35 U.S.C. 154(b) by 4 days.

(21) Appl. No.: 17/571,043

(22) Filed: Jan. 7, 2022

(65) Prior Publication Data
US 2023/0218460 A1 Jul. 13, 2023

(51) Int. Cl.
*A61G 5/10* (2006.01)
*A47C 7/14* (2006.01)

(52) U.S. Cl.
CPC .......... *A61G 5/1091* (2016.11); *A61G 5/1045* (2016.11); *A47C 7/142* (2018.08)

(58) Field of Classification Search
CPC ......... A47C 7/142; A47C 4/54; A47C 27/081; A61G 5/1091; A61G 5/1045
See application file for complete search history.

(56) References Cited

U.S. PATENT DOCUMENTS

| | | |
|---|---|---|
| 3,044,491 A | 7/1962 | Sangster |
| 3,220,695 A | 11/1965 | Downey et al. |
| 4,357,952 A | 11/1982 | Knecht |
| 4,541,136 A | 9/1985 | Graebe |
| 4,553,566 A | 11/1985 | Barclay et al. |
| 4,622,706 A | 11/1986 | Takeuchi |
| 5,343,893 A | 9/1994 | Hogan et al. |
| 5,373,595 A | 12/1994 | Johnson et al. |
| 5,502,855 A | 4/1996 | Graebe |
| 5,533,217 A | 7/1996 | Holdredge |
| 6,564,410 B2 | 5/2003 | Graebe et al. |
| 6,687,936 B2 | 2/2004 | Graebe et al. |
| 6,957,451 B2 | 10/2005 | Brennan et al. |
| 7,007,965 B2 | 3/2006 | Bernatsky et al. |
| 7,520,298 B2 | 4/2009 | George et al. |
| 8,156,589 B2 | 4/2012 | Liu et al. |
| 8,474,482 B2 | 7/2013 | Melle |
| 8,474,848 B2 | 7/2013 | Bernatsky et al. |
| 8,616,238 B2 | 12/2013 | Lee |
| 8,739,338 B2 | 6/2014 | Rickman et al. |
| 10,330,215 B2 | 6/2019 | Balsotti et al. |
| 2003/0192125 A1 | 10/2003 | Graebe et al. |
| 2014/0259430 A1 | 9/2014 | Rickman et al. |
| 2019/0038492 A1 | 2/2019 | Darnold et al. |
| 2021/0059426 A1 | 3/2021 | Bussert |

OTHER PUBLICATIONS

International Search Report and Written Opinion for Application No. PCT/US2022/053659 dated Apr. 26, 2023 (12 pages).

*Primary Examiner* — Milton Nelson, Jr.
(74) *Attorney, Agent, or Firm* — Michael Best & Friedrich LLP

(57) ABSTRACT

A multi-position airflow control assembly includes a valve housing, a valve body received by the valve housing, a plurality of connectors coupled to the valve body, each connector configured to fluidly connect to an inflation zone of a cellular cushion, and a control assembly partially received by the valve body. The control assembly includes a seal member, and an actuation assembly operably connected to the seal member and configured to rotate the seal member relative to the valve body. The seal member is configured to rotate between a first position and a second position.

20 Claims, 16 Drawing Sheets

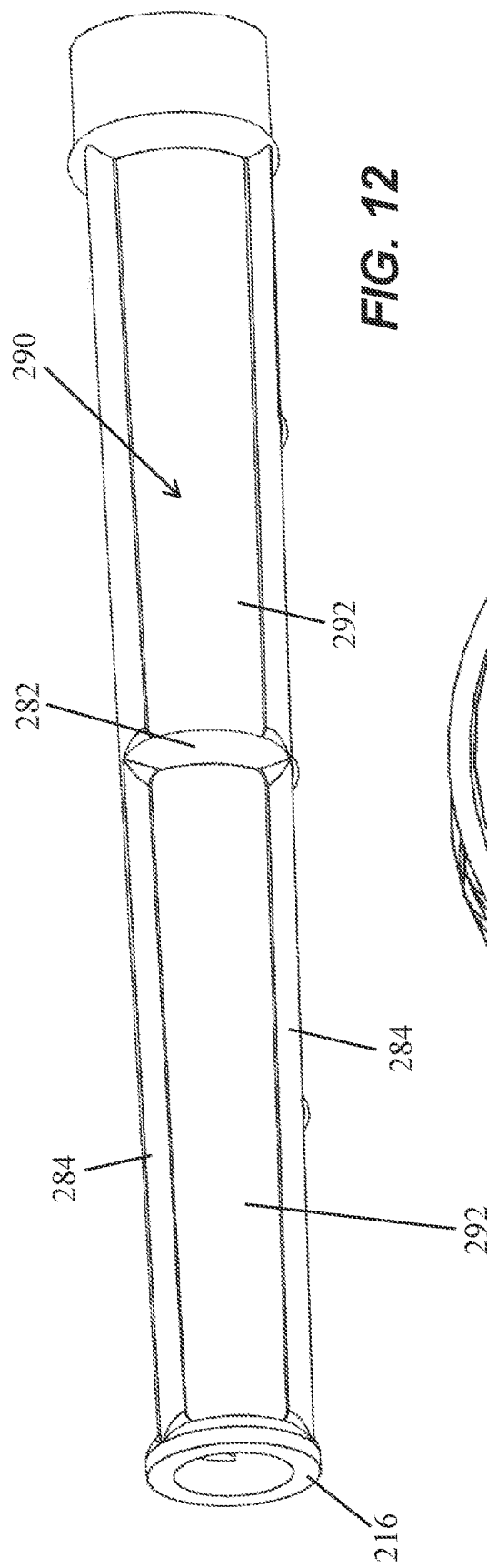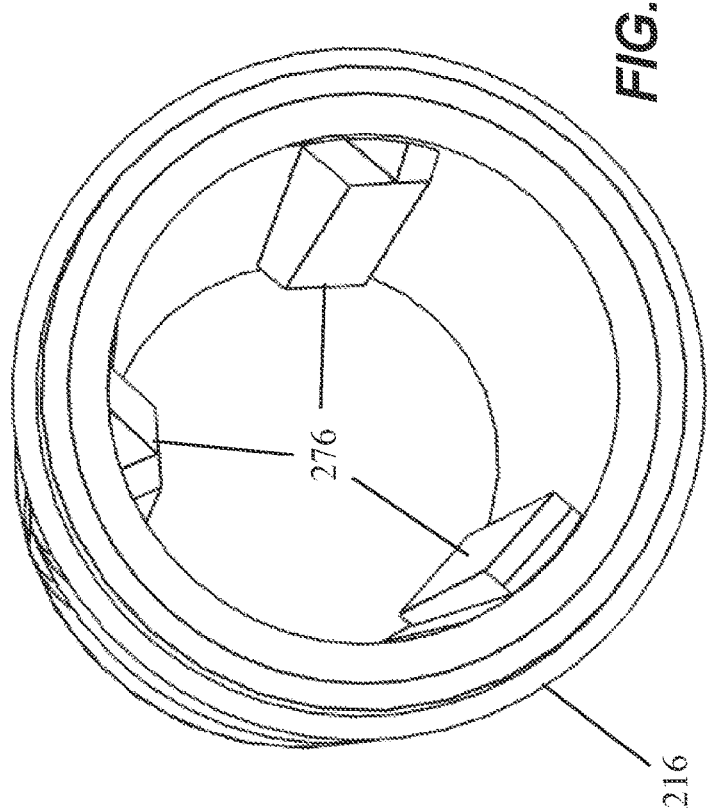

MULTI-POSITION AIRFLOW CONTROL ASSEMBLY FOR AN AIR CUSHION

FIELD OF THE DISCLOSURE

The present disclosure relates to an inflatable air cushion. More specifically, the present disclosure relates to an airflow control assembly for use with an inflatable air cushion having a plurality of inflation zones. The airflow control assembly is configured to selectively fluidly connect different combinations of inflation zones to facilitate improved adjustability and customization of the inflatable air cushion to the user.

BACKGROUND

Individuals who are confined to wheelchairs are at higher risk of tissue breakdown and the development of pressure sores, which can be difficult to treat and/or cure. In certain circumstances, much of an individual's weight can concentrate in the region of the ischium, which includes the ischial tuberosity, or the bony prominence of the buttocks. Without regular movement, the flow of blood to the skin tissue in these regions can decrease, leading to the tissue damage and the development of pressure sores. Inflatable cellular air cushions are generally known to improve distribution of weight and thus provide protection from the occurrence of tissue damage and pressure sores. These cushions can include an array of air cells that project upwardly from a common base. Within the base the air cells are configured to communicate with each other, and thus, all exist at the same internal pressure. Hence, each air cell exerts essentially the same restoring force against the buttocks, irrespective of the extent to which it is deflected. U.S. Pat. No. 4,541,136 discloses such a cellular cushion currently manufactured and sold by Permobil, Inc. of Lebanon, Tenn., USA for use on wheelchairs. The air cells can be separated into a plurality of air zones. What is needed is an improvement in a valve system for use with the air cushion that improves control and adjustability of different air zones of the air cushion. More specifically, what is needed is a valve assembly that facilitates selective fluid communication between different combinations of air cell zones of the air cushion to improve adjustability and customization of the inflatable air cushion to the user.

SUMMARY

In one embodiment, a multi-position airflow control assembly includes a valve housing, a valve body received by the valve housing, a plurality of connectors coupled to the valve body, each connector configured to fluidly connect to an inflation zone of a cellular cushion, and a control assembly partially received by the valve body. The control assembly includes a seal member, and an actuation assembly operably connected to the seal member and configured to rotate the seal member relative to the valve body. The seal member is configured to rotate between at least a first position and a second position. In response to the first position, the seal member is fluidly connected to the plurality of connectors such that the connectors are fluidly isolated from each other. In response to the second position, the seal member is fluidly connected to the plurality of connectors such that the connectors are grouped into a first group of connectors and a second group of connectors, the first group of connectors being fluidly connected, the second group of connectors being fluidly connected, and the first group of connectors being fluidly isolated from the second group of connectors.

Other aspects of the disclosure will become apparent by consideration of the detailed description and accompanying drawings.

BRIEF DESCRIPTION OF THE DRAWINGS

FIG. 12 is a perspective view of the seal member of FIG. 10, illustrating a third seal configuration.

FIG. 13 is an end view of the seal member of FIG. 10, taken along line 13-13 of FIG. 10.

Figure 1:
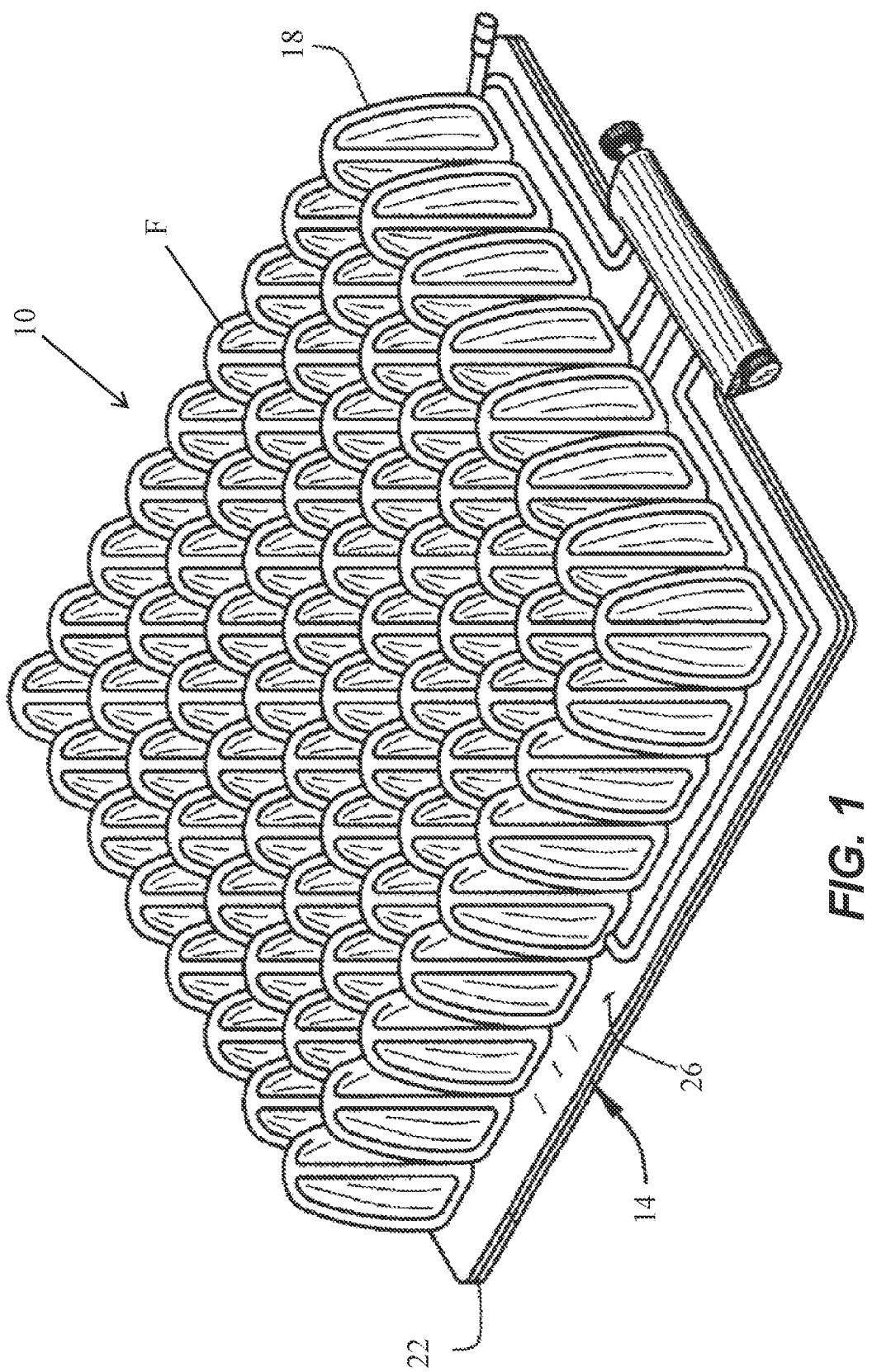
FIG. 1 is a perspective view of an example of an embodiment of a cellular cushion.

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

The present disclosure is directed to an embodiment of a multi-position airflow control assembly 200 configured for operation with a cellular cushion 10. The multi-position airflow control assembly 200 is configured to selectively fluidly connect (or selectively fluidly isolate) different combinations of inflation zones 30, 34, 38, 42 of the cellular cushion 10. The multi-position airflow control assembly 200 provides an actuation assembly 220 to facilitate selection of the associated fluid connection or isolation of the inflation zones 30, 34, 38, 42, along with an indicator member 224 to easily inform a user of the selected fluid connection or isolation.

With reference now to the figures, FIG. 1 is a perspective view of an example of an embodiment of a cellular cushion 10 (also referred to as a cellular air cushion 10). The cellular cushion 10 includes a base 14 and a plurality of air cells 18. The base 14 is formed of a lower layer 22 and an upper layer 26. The lower layer 22, which can also be referred to as a backing layer 22, can be coupled to the upper layer 26, for example through an appropriate adhesive, etc. In the illustrated embodiment, the lower layer 22 can be formed of a first material while the upper layer 26 can be formed of a second, different material. In one example of an embodiment, the lower layer 22 can be formed of polyurethane while the upper layer 26 can be formed of a flexible neoprene. In other examples of embodiments, the lower and upper layers 22, 26 can be formed of any material (or combination of materials) suitable for operation of the cellular cushion 10 as described herein. A suitable example of the cellular cushion 10 is disclosed in U.S. Pat. No. 4,541,136, the contents of which is incorporated by reference in its entirety.

The plurality of air cells 18 project away from the base 14. The plurality of air cells 18 are molded into the upper layer 26, and thus are defined by the upper layer 26. In addition, the upper layer 26 interconnects the plurality of air cells 18. Each of the plurality of air cells 18 include four fins F. In other examples of embodiments, each of the plurality of air cells 18 can have any suitable configuration, including but not limited to air cells 18 having any number of fins, any number of sides, or having no fins (e.g., cylindrical cells, cubical cells, rounded cells, etc.).

The plurality of air cells 18 are arranged on the upper layer 26 in a plurality of longitudinal and transverse rows. As such, each air cell 18 occupies both a longitudinal row and a transverse row. In other examples of embodiments, the plurality of air cells 18 can be arranged in any geometry suitable for providing support to a user. For example, the air cells 18 can be arranged in a semi-circular pattern, a circular pattern, or any other suitable arrangement or geometry of air cells 18.

Figure 2:
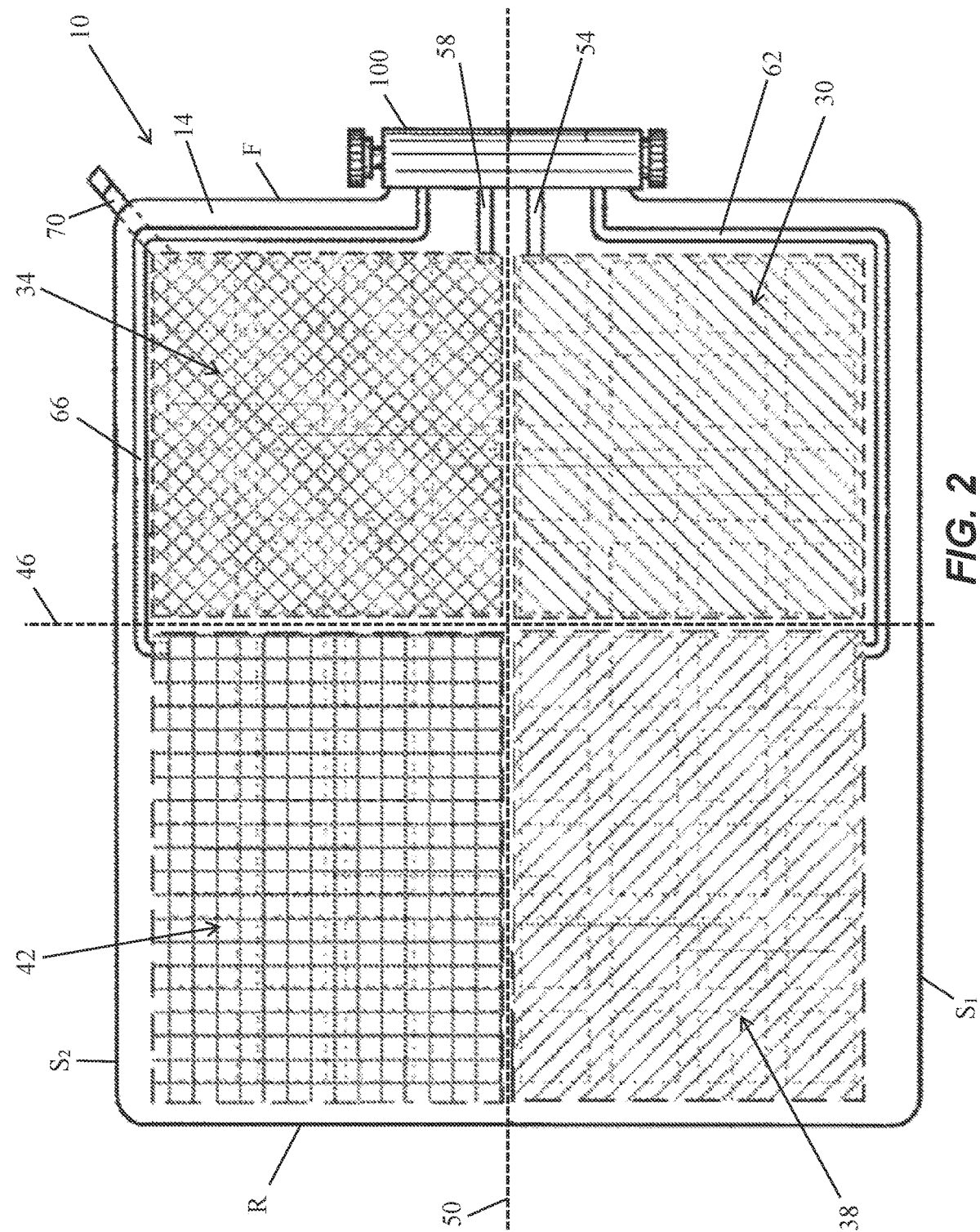
FIG. 2 is a top-down view of the cellular cushion of FIG. 1 with a plurality of cells removed to illustrate different zones of cells.

With reference now to FIG. 2, the cellular cushion 10 is arranged into a plurality of zones. More specifically, the air cells 18 (shown in FIG. 1) of the cellular cushion 10 are arranged into a plurality of zones (also referred to as inflation zones). In the illustrated embodiment, the plurality of zones include four different inflation zones 30, 34, 38, 42. A first zone 30 is positioned adjacent to a second zone 34 along a first axis 46. Stated another way, the first and second zones 30, 34 are positioned side by side at a front F (or first end F) of the cellular cushion 10. A third zone 38 is positioned adjacent to a fourth zone 42 along the first axis 46. Stated another way, the third and fourth zones 38, 42 are positioned side by side at a rear R (or second end R) of the cellular cushion 10. In addition, the first zone 30 and the third zone 38 are positioned side by side along a second axis 50. Stated another way, the first and third zones 30, 38 are positioned side by side along a right side $S_1$ (or a first side $S_1$) of the cellular cushion 10. The second zone 34 and the fourth zone 42 are also positioned side by side along the second axis 50. Stated another way, the second and fourth zones 34, 42 are positioned side by side along a left side $S_2$ (or a second side $S_2$) of the cellular cushion 10. It should be appreciated that the sides (i.e., right and left sides) are described in relation to the user sitting on the cellular cushion 10. When describing the sides in relation to viewing the cellular cushion 10 from the front F to the rear R, the first side $S_1$ can be referred to as a left side, and the second side $S_2$ can be referred to as a right side. In the illustrated embodiment, the first axis 46 is generally perpendicular to (or generally orthogonal to) the second axis 50. In other embodiments of the cellular cushion 10, the zones 30, 34, 38, 42 of air cells 18 (shown in FIG. 1) can be oriented in any suitable orientation or geometry relative to each other. In addition, in other examples of embodiments, the plurality of zones can include two zones, three zones, five or more zones, or any suitable or desired number of zones. It should be appreciated that each zone 30, 34, 38, 42 includes a plurality of air cells 18 (shown in FIG. 1).

A fluid conduit 54, 58, 62, 66 (also referred to as an air conduit 54, 58, 62, 66) fluidly connects each of the plurality of zones 30, 34, 38, 42 to a valve assembly 100. A first fluid conduit 54 fluidly connects the first zone 30 to the valve assembly 100. A second fluid conduit 58 fluidly connects the second zone 34 to the valve assembly 100. A third fluid conduit 62 fluidly connects the third zone 38 to the valve assembly 100. A fourth fluid conduit 66 fluidly connects the fourth zone 42 to the valve assembly 100. It should be appreciated that each zone 30, 34, 38, 42 is generally fluidly isolated from any other zone 30, 34, 38, 42. It should be appreciated that each conduit 54, 58, 62, 66 can be formed in any suitable manner. For example, in one example of an embodiment each conduit 54, 58, 62, 66 can be molded or vacuum formed between the lower and upper layers 22, 26 of the base 14 (shown in FIG. 1).

An air valve 70 (also referred to as an inflation-deflation valve 70) is fluidly connected to the plurality of air cells 18 (shown in FIG. 1). More specifically, the air valve 70 is fluidly connected to the second zone 34. In other examples of embodiments, the air valve 70 can be fluidly connected to first zone 30, third zone 38, or fourth zone 42. The air valve 70 is configured to facilitate inflation and deflation of the plurality of air cells 18 (or inflation and deflation of the plurality of zones 30, 34, 38, 42). For example, the air valve 70 can be configured to engage an air pump (not shown) to facilitate inflation. The air pump can be a hand pump, a manual pump, a motorized pump, or any other suitable pump that is configured to supply air to the cellular cushion 10. The air pump (not shown) can provide a flow of air to one zone (for example, the second zone 34 the first zone 30, etc.). Air travels from the second zone 34 to the valve assembly 100 through the conduit 58. The air is then distributed to the other zones 30, 38, 42 through the respective conduits 54, 62, 66 by the valve assembly 100. Similarly, the air valve 70 can be configured to deflate the plurality of cells 18 (shown in FIG. 1) of the cellular cushion 10. The air valve 70 can be opened to the atmosphere, facilitating a release of air within the plurality of cells 18. More specifically, air can flow from the first, third, and fourth zones 30, 38, 42 to the second zone 34. The air flows through the respective conduits 54, 62, 66 to the valve assembly 100, where it is directed through the conduit 58 to the second zone 34, and then discharged from the cellular cushion 10 through the air valve 70.

The valve assembly 100 shown in FIG. 2 is configured to selectively open or close. In response to being in an open position, the valve assembly 100 is configured to fluidly connect all of the zones 30, 34, 38, 42 through the respective conduits 54, 58, 62, 66. The open position is desired for inflation or deflation of the zones 30, 34, 38, 42 (or the associated air cells 18, shown in FIG. 1). In response to being in a closed position, the valve assembly 100 is configured to fluidly disconnect all of the zones 30, 34, 38, 42. As such, each of the plurality of zones 30, 34, 38, 42 is fluidly isolated such that air cannot travel from one zone 30, 34, 38, 42 to any of the other zones 30, 34, 38, 42 through the respective conduits 54, 58, 62, 66. Stated another way, the valve assembly 100 blocks any such fluid movement between zones 30, 34, 38, 42. An example of the valve assembly 100 is disclosed in U.S. Pat. No. 6,687,936, the contents of which is herein incorporated by reference in its entirety. The valve assembly 100 has certain limitations, namely in only having two positions—the open position and the closed position.

FIGS. 3-18 illustrate an embodiment of a multi-position airflow control assembly 200. The multi-position airflow control assembly 200 is configured to engage the cellular cushion 10 in place of the valve assembly 100. The multi-position airflow control assembly 200 advantageously provides selective adjustment to fluidly connect different combinations of zones 30, 34, 38, 42. Thus, the multi-position airflow control assembly 200 can fluidly isolate all of the zones 30, 34, 38, 42, can fluidly connect all of the zones 30, 34, 38, 42, and/or can fluidly connect combinations of the zones 30, 34 and zones 38, 42. In other examples of embodiments, the multi-position airflow control assembly 200 can fluidly connect one or more different combinations of zones, including, but not limited to, zones 30, 38 and zones 34, 42. In yet other examples of embodiments, the multi-position airflow control assembly 200 can fluidly connect one or more zones, while fluidly isolating the remaining zones. For example, zones 30, 34 can be fluidly connected, while zone 38 and zone 42 are fluidly isolated from zones 30, 34 and further are fluidly isolated from each other. Stated another way, there are effectively three zones in this configuration—a first zone 30, 34, a second zone 38, and a third zone 42. In this configuration, the two zones 30, 34 positioned closest to the front F of the cellular cushion 10 are in fluid communication with each other. As another example, zones 38, 42 can be fluidly connected, while zone 30 and zone 34 are fluidly isolated from zones 38, 42 and further are fluidly isolated from each other. Stated another way, there are effectively three zones—a first zone 30, a second zone 34, and a third zone 38, 42. In this configuration, the two zones 38, 42 positioned closest to the rear R of the cellular cushion 10 are in fluid communication with each other. It should be appreciated that the multi-position airflow control assembly 200 can be configured to fluidly connect (or isolate) any suitable or desired zone or combination of associated zones from the remaining zones.

Figure 3:
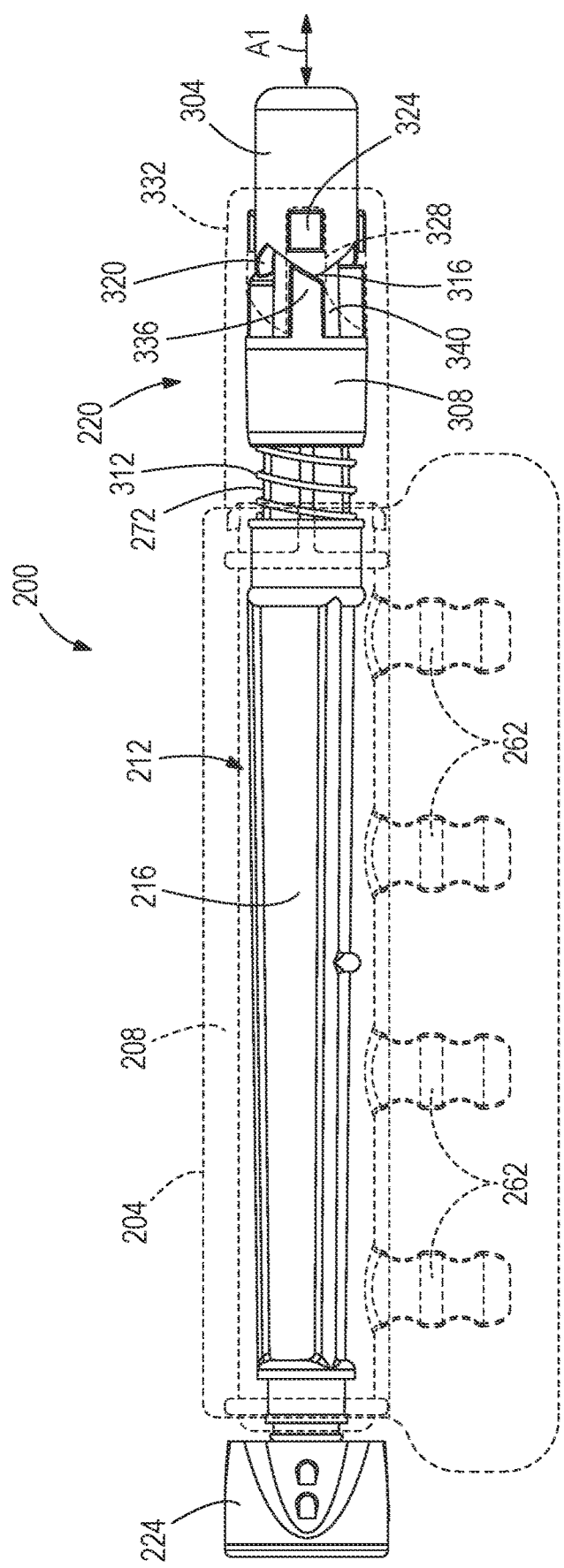
FIG. 3 is a top-down view of an example of an embodiment of a multi-position airflow control assembly for use with the cellular cushion of FIG. 1, a valve housing and a valve body are illustrated in hidden lines for purposes of clarity.
Figure 4:
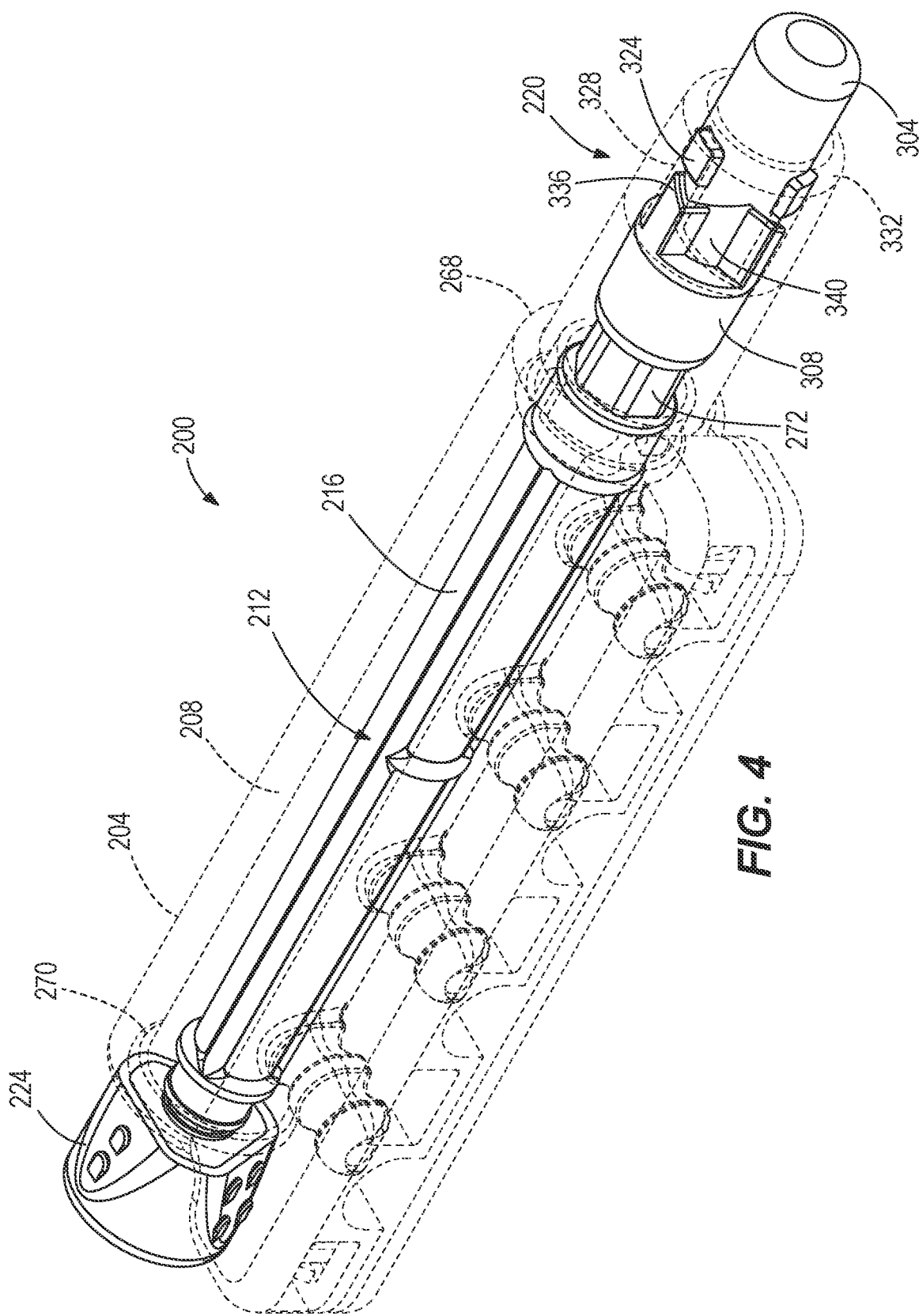
FIG. 4 is a perspective view of the multi-position airflow control assembly of FIG. 3, the valve housing and the valve body are illustrated in hidden lines for purposes of clarity, and the biasing member of an actuation assembly is removed.

With specific reference to FIGS. 3-4, the multi-position airflow control assembly 200 includes a valve housing 204 (also referred to as an outer housing 204). The valve housing 204 is configured to house a valve body 208. A control assembly 212 is partially received by the valve body 208. The control assembly 212 carries a seal member 216 that is configured to rotate relative to the valve body 208. In response to the orientation of the seal member 216 relative to the valve body 208, the seal member 216 is configured to facilitate (or restrict) a fluid connection between one or more of the inflation zones 30, 34, 38, 42 (shown in FIG. 2). The control assembly 212 also includes an actuation assembly 220 that is configured to facilitate selective rotation of the seal member 216 relative to the valve body 208. In addition, the control assembly 212 includes an indicator member 224. The indicator member 224 includes indicia that indicates to a user the position of the seal member 216. While the seal member 216 is received by the valve body 208, a portion of the control assembly 212 and the indicator member 224 are positioned outside of the valve body 208.

Figure 5:
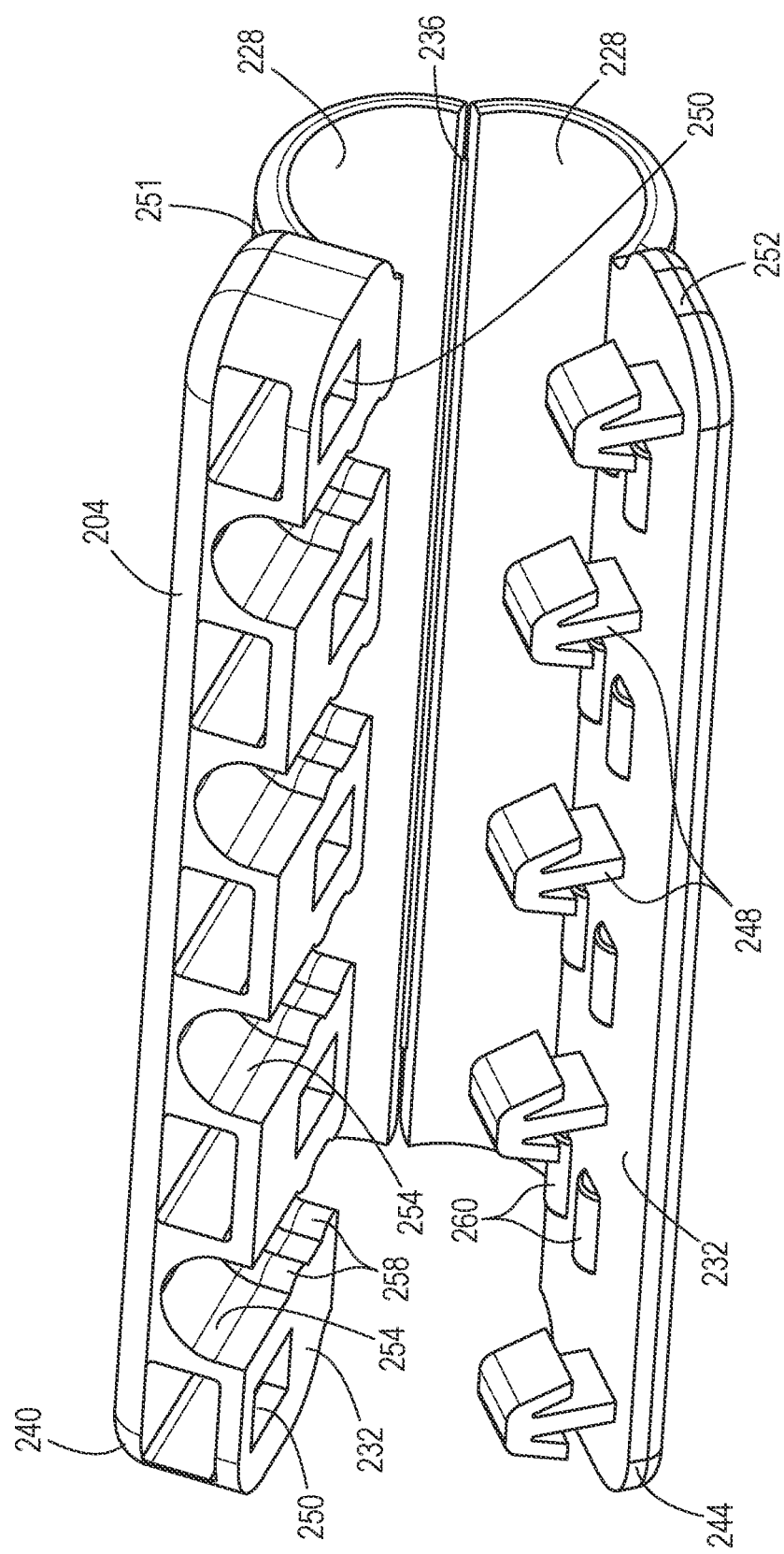
FIG. 5 is a perspective view of the valve housing of the multi-position airflow control assembly of FIG. 3 shown in an open configuration.

With reference now to FIG. 5, the valve housing 204 is illustrated in an open configuration with the valve body 208 and control assembly 212 removed. The valve housing 204 includes a first portion 228 and a second portion 232. The first portion 228 defines a valve body receiving portion 228. The first portion 228 is configured to receive and partially surround the valve body 208 (shown in FIG. 6). The first portion 228 is also configured to have a complimentary geometry to the valve body 208 in order to assist with retention of the valve body 208. In the illustrated embodiment, the first portion 228 defines a generally cylindrical housing configured to partially surround and retain the generally cylindrical valve body 208. In other examples of embodiments, the first portion 228 can define any suitable, complimentary geometry to the valve body 208 (e.g., triangular, square, rectangle, any other suitable polygonal shape, etc.).

The second portion 232 defines a base engagement portion 232 (also referred to as a cushion engagement portion 232). The valve housing 204 forms a clamshell configuration. A hinge 236 is positioned in the first portion 228. The hinge 236 is illustrated as a living hinge integral to the first portion 228. However, in other examples of embodiments, the hinge 236 can be any suitable hinge to facilitate operation of the clamshell configuration of the valve housing 204. The second portion 232 includes a first end 240 and a second end 244. The first and second ends 240, 244 are configured to selectively fasten together by a plurality of fasteners 248. In addition, the first and second ends 240, 244 are configured to engage a portion of the base 14 (shown in FIG. 2). More specifically, in response to being fastened together, the first and second ends 240, 244 are configured to engage and retain a portion of the base 14 (shown in FIG. 2), trapping the portion of the base 14 between the ends 240, 244 and fastening the control assembly 200 to the base 14. To facilitate the fastening connection, the second end 244 carries the plurality of fasteners 248. The fasteners 248 are illustrated as arrowhead fasteners 248 that are configured to engage a corresponding aperture 250 defined by the first end 240. The fasteners 248 in the illustrated embodiment are integrally formed with the associated end of the valve housing 204. It should be appreciated that in other examples of embodiments, the fasteners 248 can be mounted on one of the first or second end 240, 244, while the apertures 250 can be defined by the other of the second or first end 244, 240. In addition, in other examples of embodiments, the fasteners 248 can be separate (or not integrally formed) with either end 240, 244. Further, the fasteners 248 can be any fastener (e.g., bolt, screw, etc.) suitable for selectively fastening the ends 240, 244 of the valve housing 204. It should be appreciated that the valve housing 204 can also be described as including a first housing member 251 and a second housing member 252. The first housing member 251 can include a portion of the first portion 228 and a portion of the second portion 232. Similarly, the second housing member 252 can include a portion of the first portion 228 and a portion of the second portion 232. In the illustrated embodiment, the first and second housing members 251, 252 are hingedly connected by the hinge 236. In one or more alternative examples of embodiments, the first housing member 251 and the second housing member 252 do not include the hinge 236, and thus are not in a hinged connection. Instead, the first and second housing members 251, 252 can be separate components that define two halves of the valve housing 204. The first and second housing members 251, 252 can fasten together by the fastening connection of fasteners 248 engaging respective apertures 250.

In addition, the first and second ends 240, 244 are configured to assist with maintaining a connection between each of the fluid conduits 54, 58, 62, 66 and the valve body 208. The first end 240 defines a plurality of channels 254. The channels 254 are configured to receive an associated connector 262 (shown in FIG. 6) of the valve body 208, which is discussed in additional detail below. Each channel 254 includes a plurality of first projections 258 (or at least one first projection 258) that extends around an inner circumference of the channel 254. In the illustrated embodiment, each channel 254 is semi-cylindrical with the associated first projections 258 being arcuate. The second end 244 also includes a plurality of second projections 260. At least one second projection 260 is associated with each channel 254. Each first projection 258 (also referred to as a first rib 258) and second projection 260 (also referred to as a second rib 260) associated with each channel 254 are configured to engage an associated circumferential channel defined by the respective connector to assist with retention of the connector 262 (shown in FIG. 6) in the channel 254. Stated another way, the projections 258, 260 restrict movement of each connector 262 (shown in FIG. 6) in the respective channel 254. In the illustrated embodiment, each channel 254 includes a pair of first projections 258 and a pair of second projections 260. In other examples of embodiments, each channel 254 can include at least one first projection 258 and at least one second projection 260. In other examples of embodiments, each channel 254 can include a plurality of first projections 258 and a plurality of second projections 260. It should be appreciated that in other examples of embodiments, the second end 244 can define the plurality of channels 254, while the first end 240 can define projections 260. In yet other examples of embodiments, the projections 258, 260 can be optional.

The valve housing 204 includes a number of channels 254 that correspond to the number of connectors 262 (shown in FIG. 6) of the valve body 208. The number of connectors 262 (shown in FIG. 6) of the valve body 208 generally correspond to the number of fluid conduits 54, 58, 62, 66 of the cellular cushion 10. In the illustrated embodiment, the valve housing 204 includes a plurality of channels 254. More specifically, the valve housing 204 includes four channels 254. These channels 254 correspond to the number of fluid conduits 54, 58, 62, 66 of the cellular cushion 10. In other examples of embodiments, the valve housing 204 can have any suitable number of channels 254 (e.g., 2, 3, 5 or more, etc.) to correspond to a valve body 208 having a related number of connectors 262 (shown in FIG. 6) for use with a cellular cushion 10 having an equivalent number of fluid conduits.

Figure 6:
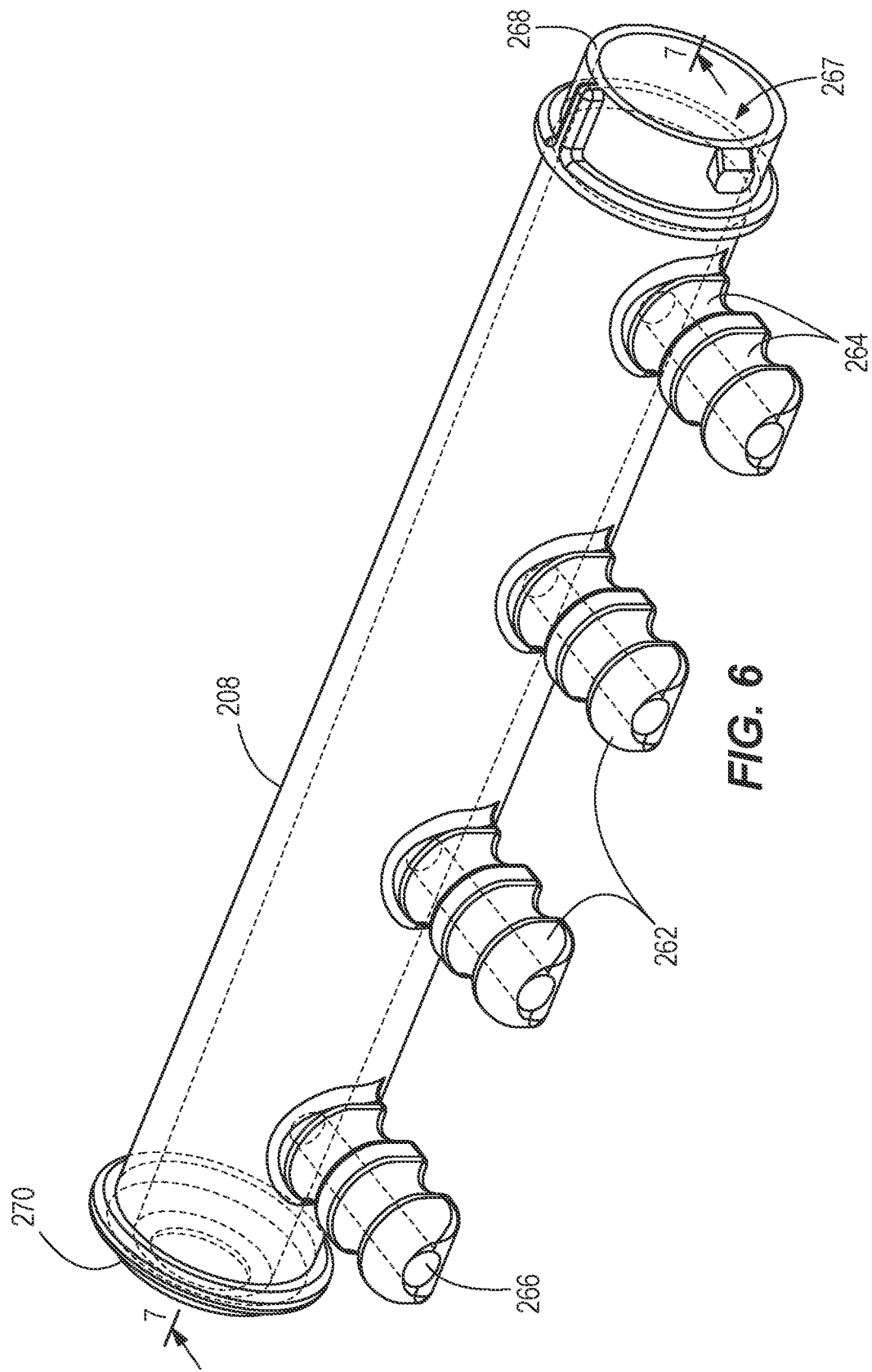
FIG. 6 is a perspective view of the valve body of the multi-position airflow control assembly of FIG. 3.

With reference now to FIG. 6, the valve body 208 is illustrated. The valve body 208 includes the plurality of connectors 262 (or nipples 262). The connectors 262 radially extend from the valve body 208. Each connector 262 defines a plurality of circumferential recesses 264 (or at least one circumferential recess 264). The recesses 264 are configured to receive the projections 258, 260 of the valve housing 204 (shown in FIG. 5), as discussed above. Each of the connectors 262 define a port 266 (also referred to as an internal channel 266) to form a fluid connection to an interior 267 of the valve body 208. In addition, each connector 262 is configured to fluidly connect to an associated fluid conduit 54, 58, 62, 66 of the cellular cushion 10. For example, each connector 262 is configured to be received by an associated fluid conduit 54, 58, 62, 66. This forms a fluid connection between each fluid conduit 54, 58, 62, 66 to the interior 267 of the valve body 208 through the internal channel 267 of each respective connector 262. In other examples of embodiments, each connector 262 can form a fluid connection with a respective fluid conduit 54, 58, 62, 66 in any suitable or desired fashion.

Figure 7:
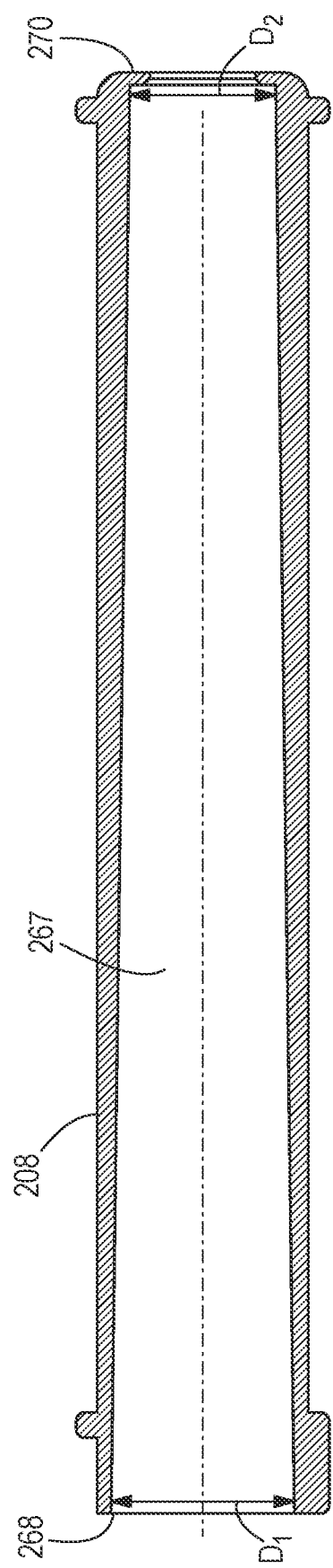
FIG. 7 is a cross-sectional view of the valve body of FIG. 6, taken along line 7-7 of FIG. 6.

In the illustrated embodiment, the interior 267 of the valve body 208 is substantially hollow. The valve body 208 includes a first end 268 opposite a second end 270. The first and second ends 268, 270 are on opposing ends of the interior 267 of the valve body 208. With reference now to FIG. 7, which is a cross-sectional view of the valve body 208 of FIG. 6, the interior 267 of the valve body 208 has a decreasing diameter from the first end 268 to the second end 270. Stated another way, the hollow interior 267 at the first end 268 has a first diameter $D_1$, while the hollow interior 267 at the second, opposite end 270 has a second diameter $D_2$. The first diameter $D_1$ is greater than the second diameter $D_2$. Thus, the hollow interior 267 can be described as having a frustoconical shape. The geometry of the hollow interior 267 assists with an improved air seal while facilitating rotation of the control assembly 212 relative to the valve body 208, as discussed in additional detail below. It should also be appreciated that the valve body 208 includes apertures at the first and second ends 268, 270 to facilitate receipt of the control assembly 212, as the control assembly 212 partially extends out of the valve body 208 at both the first and second ends 268, 270 (as shown in FIG. 3).

Figure 8:
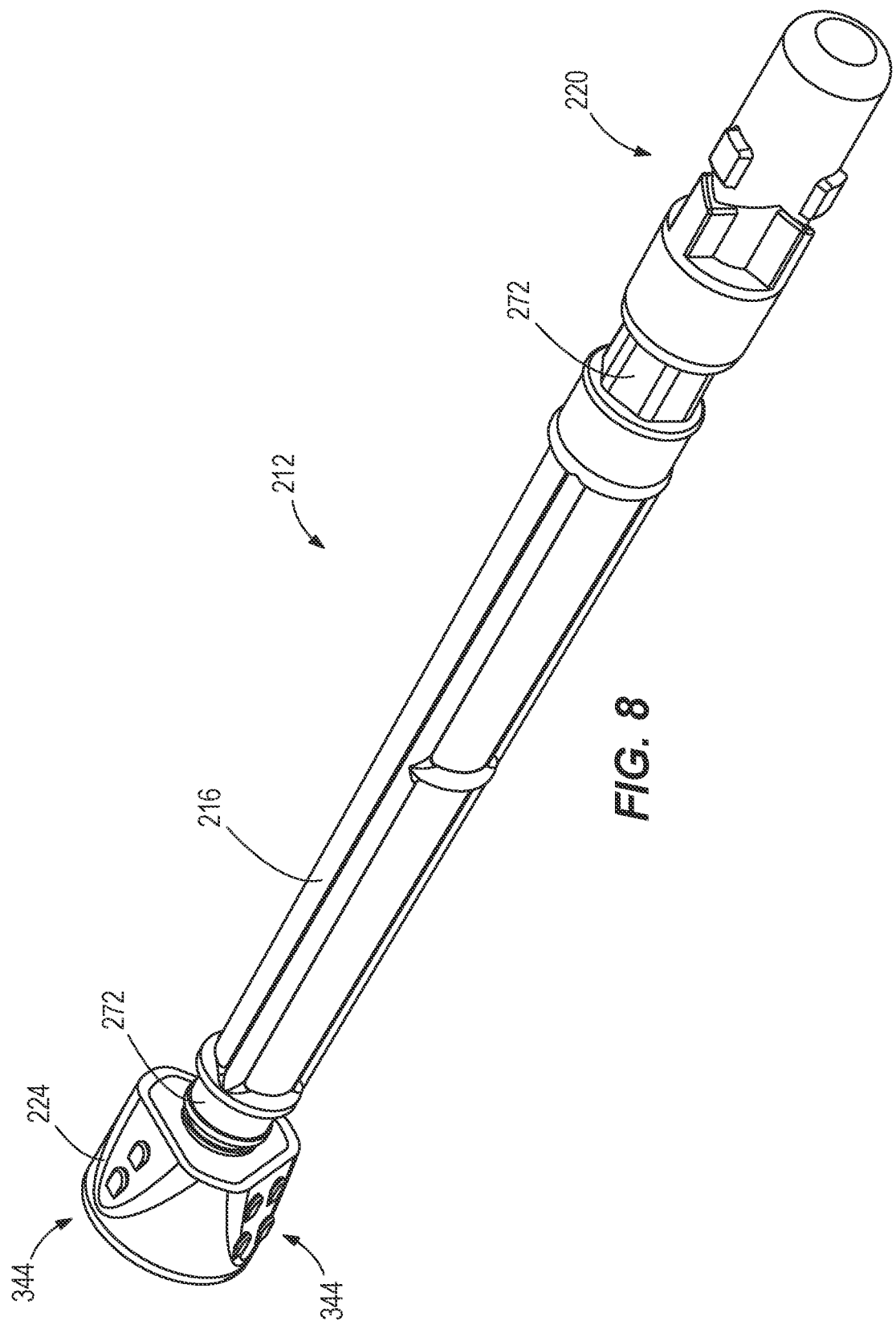
FIG. 8 is a perspective view of a control assembly of the multi-position airflow control assembly of FIG. 3, shown detached from the valve housing and the valve body.
Figure 9:
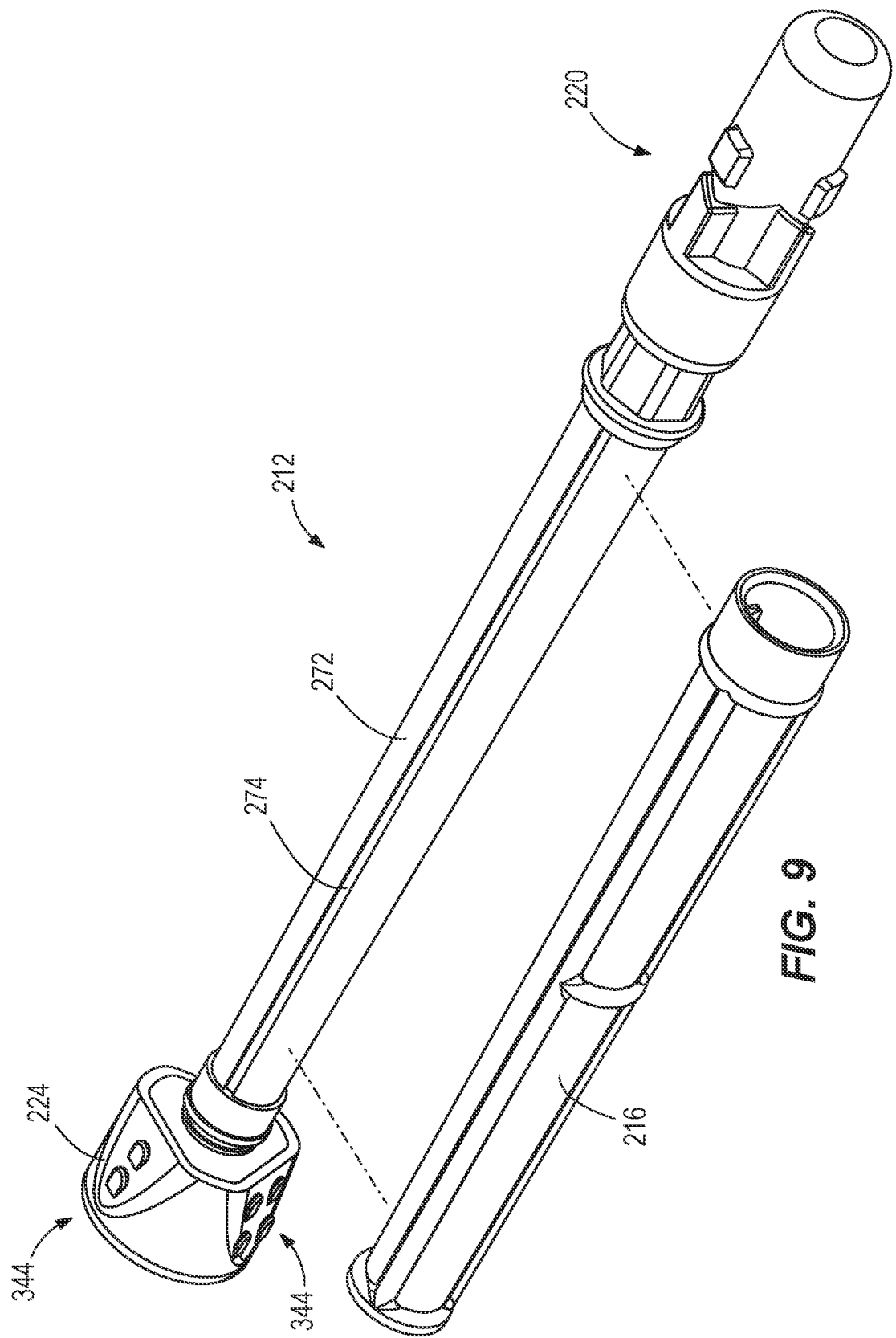
FIG. 9 is a perspective view of the control assembly of FIG. 8, with the seal member shown as detached from a shaft.

FIGS. 8-9 illustrate the control assembly 212 detached from the valve housing 204 and the valve body 208. The control assembly 212 includes a shaft 272 (also referred to as a spindle 272). The shaft 272 is configured to carry the seal member 216. With reference specifically to FIG. 9, the shaft 272 can includes at least one channel 274. In the illustrated embodiment, the shaft 272 includes a plurality of channels 274, and more specifically three channels 274 longitudinally extending and circumferentially spaced along the shaft 272. The channels 274 are configured to receive associated elongated projections 276 (shown in FIG. 13) that radially extend inwardly on an inner circumference of the seal member 216. In the illustrated embodiment, the seal member 216 is a sleeve of suitable material configured to selectively form an airtight seal within a portion of the valve body 208. For example, the material can be silicone, a silicone compound, or any other suitable material for generating the airtight seal within a portion of the valve body 208 while also having suitable durability to rotate relative to the valve body 208. In other examples of embodiments, the seal member 216 can be integrated into the shaft 272. For example, the seal member 216 can be over-molded onto the shaft 272, etc.

Figure 10:
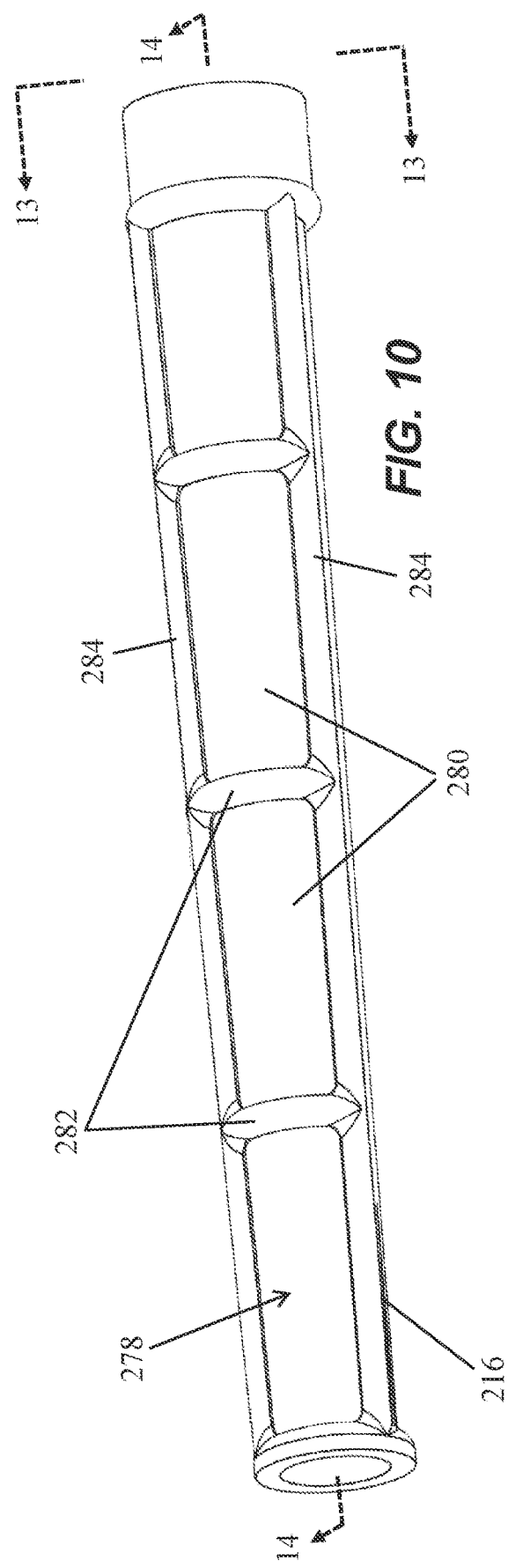
FIG. 10 is a perspective view of a seal member of the control assembly of FIG. 8, illustrating a first seal configuration.
Figure 11:
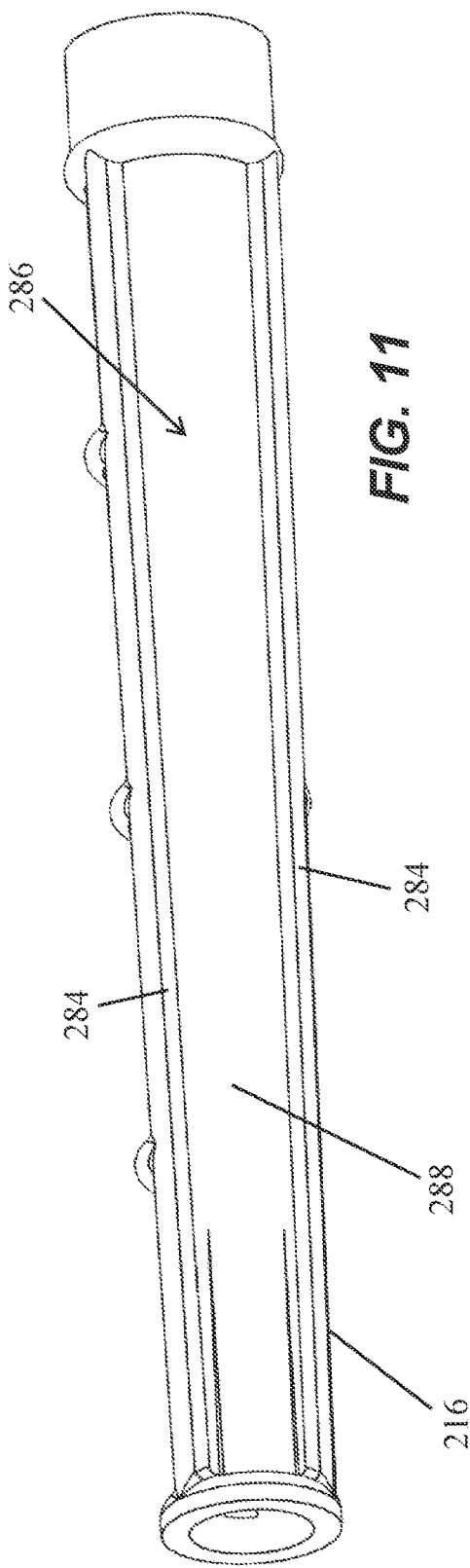
FIG. 11 is a perspective view of the seal member of FIG. 10, illustrating a second seal configuration.

With reference now to FIGS. 10-12, the seal member 216 includes a plurality of seal configurations to selectively facilitate different fluid connections between the fluid conduits 54, 58, 62, 66 and associated inflation zones 30, 34, 38, 42 of the cellular cushion 10 (shown in FIG. 1). FIG. 10 illustrates a first seal configuration 278. In the first seal configuration 278, the seals are divided into a plurality of separated compartments 280. More specifically, the seals are divided into four fluidly separate compartments 280. Each compartment 280 is separated from an adjacent compartment 280 by a circumferential radial divider 282. The first seal configuration 278 is also separated from an adjacent seal configuration by a pair of elongated radial dividers 284 extending along a length of the seal member 216. As such, the elongated radial dividers 284 separate each seal configuration. In the first seal configuration 278, each compartment 280 is isolated from an adjacent compartment. In turn, air cannot flow between compartments 280. When oriented within the valve body 208 into fluid communication with the connectors 262, the first seal configuration 278 results in each of the fluid conduits 54, 58, 62, 66 and associated inflation zones 30, 34, 38, 42 being fluidly isolated from each other. As such, air cannot travel between the inflation zones 30, 34, 38, 42 in response to the first seal configuration 278.

FIG. 11 illustrates a second seal configuration 286. In the second seal configuration 286, the seals are divided into a single compartment 288. The second seal configuration 286 is separated from an adjacent seal configuration by a pair of elongated radial dividers 284 extending along the length of the seal member 216. In the second seal configuration 286, the single compartment 288 facilitates a flow of air within the compartment 288. When oriented within the valve body 208 into fluid communication with the connectors 262, the second seal configuration 286 results in each of the fluid conduits 54, 58, 62, 66 and associated inflation zones 30, 34, 38, 42 being fluidly connected to each other. As such, air is free to travel between the inflation zones 30, 34, 38, 42 in response to the second seal configuration 286.

FIG. 12 illustrates a third seal configuration 290. In the third seal configuration 290, the seals are divided into a pair of separated compartments 292. More specifically, the seals are divided into two fluidly separate compartments 292. The compartments 292 are separated from the adjacent compartment 292 by a single circumferential radial divider 282. The third seal configuration 290 is also separated from an adjacent seal configuration by a pair of elongated radial dividers 284 extending along a length of the seal member 216. As such, the elongated radial dividers 284 separate each seal configuration. In the third seal configuration 290, each of the two compartments 292 are fluidly isolated. Thus, air cannot flow between the compartments 292. When oriented within the valve body 208 into fluid communication with the connectors 262, the third seal configuration 290 results in two fluid conduits being fluidly connected. Stated another way, the third seal configuration 290 results in a first group of inflation zones 30, 38 and a second group of inflation zones 34, 42. The first group of inflation zones, which in the present embodiment is a first pair of inflation zones 30, 38, are fluidly connected. The second group of inflation zones, which in the present embodiment is a second pair of inflation zones 34, 42, are also fluidly connected. Air is configured to flow between the first pair of inflation zones 30, 38. Similarly, air is configured to flow between the second pair of inflation zones 34, 42. However, air is restricted from flowing from the first pair of inflation zones to the second pair of inflation zones, and vice versa. In the illustrated embodiment, the first pair of inflation zones correspond to the first side $S_1$, and the second pair of inflation zones correspond to the second side $S_2$ of the cellular cushion 10. It should be appreciated that in other examples of embodiments, the third seal configuration 290 can be reoriented with the associated fluid conduits 54, 58, 62, 66 such that the third seal configuration 290 results in the first pair of inflation zones corresponding to the front F inflation zones 30, 34, and the second pair of inflation zones correspond to the rear R inflation zones 38, 42. It should also be appreciated that the first group of inflation zones can be referred to as a first group of connectors 262, and the second group of inflation zones can be referred to as a second group of connectors 262. It should also be appreciated that while the first group of connectors are fluidly connected, and the second group of connectors are fluidly connected, the first and second group of connectors 262 are fluidly isolated from each other.

It should be appreciated that the illustrated embodiment of the seal member 216 includes a plurality of different seal configurations 278, 286, 290, and more specifically three different seal configurations 278, 286, 290. In this embodiment, each the plurality of seal configurations 278, 286, 290 are circumferentially offset around a circumference of the seal member 216. Stated another way, the three seal configurations 278, 286, 290 are each circumferentially offset relative to the adjacent seal configuration by approximately 120°. Stated another way, the seal member 216 is configured to rotate approximately 120° to orient a selected (or desired) seal configuration 278, 286, 290 into fluid communication with the connectors 262 of the valve body 208. In other examples of embodiments, the seal member 216 can include two different seal configurations, or four or more different seal configurations. In yet other examples of embodiments, the seal member 216 can include four seal configurations, with the four seal configurations being separated into two pair of alternating configurations around the circumference (e.g., the first and second seal configurations 278, 286 can alternate twice, the first and third seal configurations 278, 290 can alternate twice, the second and third seal configurations 286, 290 can alternate twice, etc.). In yet other examples of embodiments, the seal member 216 can include any suitable number or arrangement of seal configurations.

Figure 14:
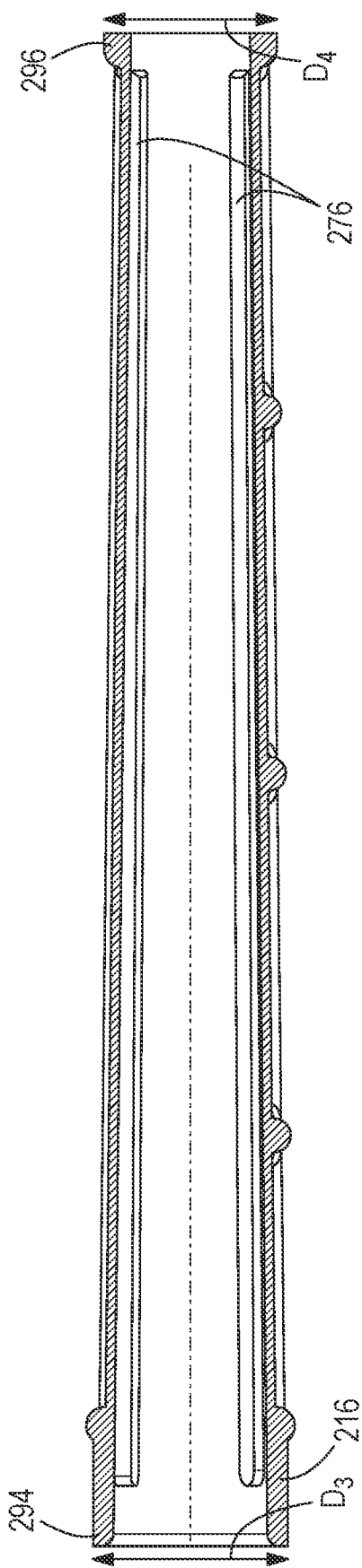
FIG. 14 a cross-sectional view of the seal body of FIG. 10, taken along line 14-14 of FIG. 10.

With reference now to FIG. 14, a geometry of the seal member 216 is illustrated. The geometry is complimentary to the geometry of the valve body 208 shown in FIG. 7. The seal member 216 includes a first end 294 opposite a second end 296. The seal member 216 has a decreasing diameter from the first end 294 to the second end 296. Stated another way, the seal member 216 at the first end 294 has a third diameter $D_3$, while the seal member 216 at the second, opposite end 296 has a fourth diameter $D_4$. The third diameter $D_3$ is greater than the fourth diameter $D_4$. Thus, the seal member 216 can be described as having a frustoconical shape, which is complimentary to the frustoconical shape of the interior 267 of the valve body 208 shown in FIG. 7.

Referring back to FIG. 3, the control assembly 212 includes the actuation assembly 220. The actuation assembly 220 is configured to selectively rotate the seal member 216 relative to the valve body 208. More specifically, the actuation assembly 220 is configured to rotate the shaft 272 that carries the seal member 216. The shaft 272 and the seal member 216 are configured to rotate relative to the valve body 208 (and the valve housing 204).

The actuation assembly 220 includes a first actuation member 304, a second cam member 308, and a biasing member 312. With specific reference to FIG. 15, the first actuation member 304 is a plunger that includes a plurality of alternating angled projections 316 and angled recesses 320 around an outer circumference of the plunger. The first actuation member 304 also includes a plurality of raised projections 324 that extend radially away from the plunger. Each of the raised projections 324 is received and configured to slide within a horizontal channel 328 defined by a portion of a housing 332. The housing 332 is configured to receive the actuation assembly 220 and can be coupled to the valve housing 204 (shown in FIG. 3). The housing 332 also defines a sloped surface 330 (or angled surface) that extends between consecutive horizontal channels 328. The sloped surface 330 is configured to guide the second cam member 308 during actuation, facilitating rotation of the cam member 308.

Referring back to FIG. 3, the second cam member 308 is coupled to the shaft 272. More specifically, the second cam member 308 is configured to slide along the shaft 272, and further facilitate rotation of the shaft 272. Stated another way, the second cam member 308 is keyed to engage the shaft 272. To facilitate this operation, the shaft 272 can include a polygonal cross-sectional shape. In the illustrated embodiment, the shaft 272 has a generally hexagonal cross-sectional shape. In other embodiments, the shaft can have a triangular, square, rectangular, or any other suitable cross-sectional shape to facilitate sliding movement of the second cam member 308 relative to the shaft 272, while also allowing the shaft 272 to rotate following rotation of the second cam member 308. The second cam member 308 includes a plurality of cam surfaces 336 (also shown in FIG. 15). In the illustrated embodiment, the second cam member 308 includes approximately three cam surfaces 336. Each cam surface 336 is configured to be slidably received by one of the horizontal channels 328 defined by the housing 332. The number of cam surfaces 336 correspond to the number of seal configurations 278, 286, 290. Each cam surface 336 defines an angled (or sloped) end surface. Each cam surface 336 is circumferentially separated from an adjacent cam surface 336 by a recess 340. As shown in FIG. 3, the biasing member 312 receives a portion of the shaft 272 and is configured to apply a biasing force against the second cam member 308. The biasing member 312 can be any suitable member configured to apply a biasing force onto the second cam member 308 (e.g., spring, etc.).

Figure 15:
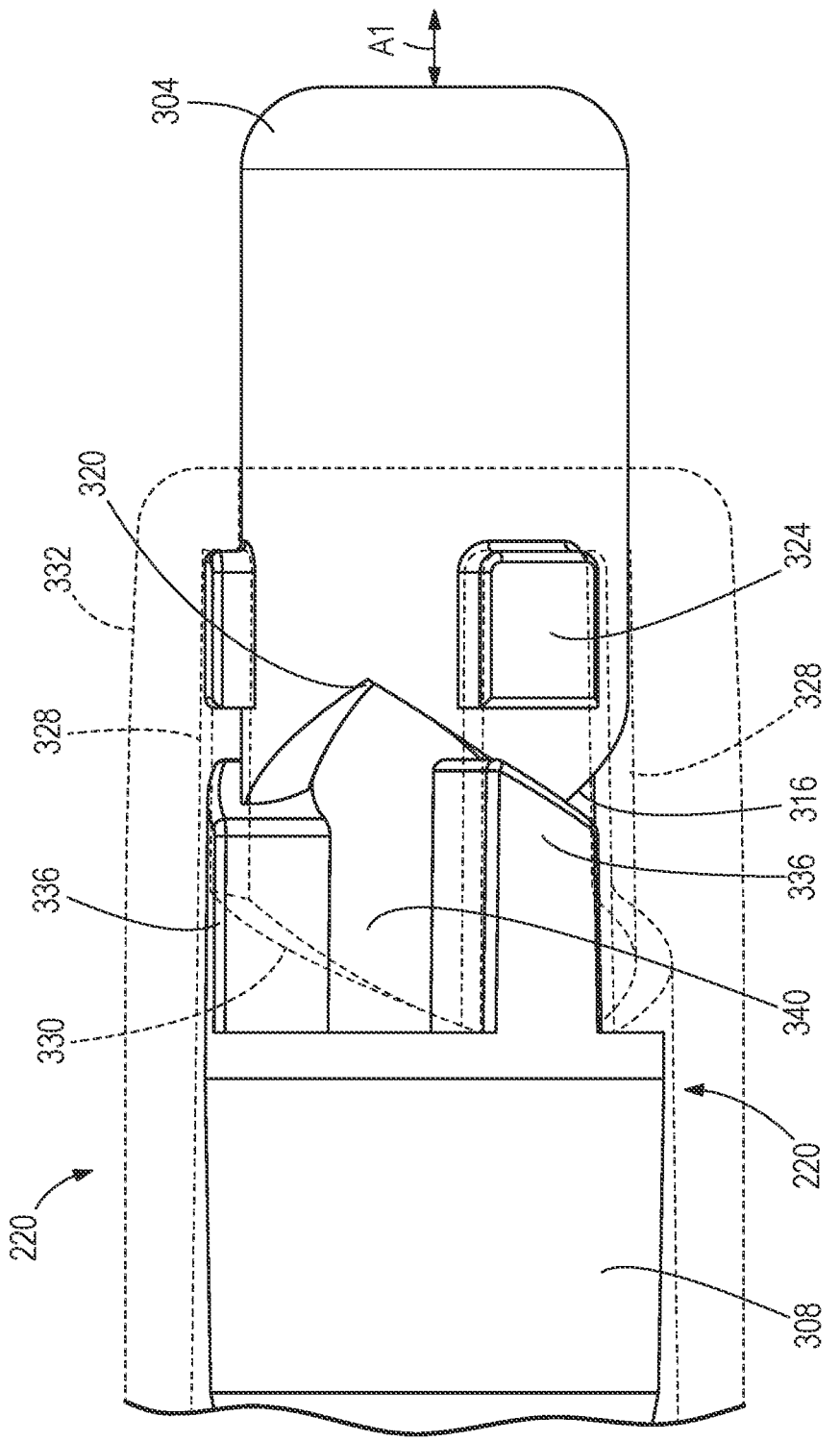
FIG. 15 is a perspective view of an actuation assembly of the control assembly of FIG. 8, with a housing shown as semi-transparent to illustrated internal components for clarity.

With reference to FIG. 15, in operation, the actuation assembly 220 is configured to rotate the seal member 216 in response to lateral movement along a first axis Ai. A user depresses a portion of the actuation assembly 220, and specifically the first actuation member 304, towards the second cam member 308. The first actuation member 304 slides relative to the housing 332 along the first axis Ai. The first axis Ai is defined by the shaft 272 (shown in FIG. 3). Alternatively, the first axis Ai is defined by the seal member 216 (also shown in FIG. 3). The first axis Ai is generally parallel to the shaft 272, and generally parallel to the seal member 216 carried by the shaft 272. As the first actuation member 304 slides towards the second cam member 308, each raised projection 324 slides within each associated channel 328, restricting rotational movement of the first actuation member 304. In addition, the first actuation member 304, by each angled projection 316, engages and then laterally slides the second cam member 308 along the shaft 272 (or relative to the shaft 272), compressing the biasing member 312 (shown in FIG. 3). The cam surfaces 336 of the second cam member 308, which are each received in one of the horizontal channels 328 defined by the housing 332, responsively slide relative to the horizontal channels 328 towards an exit end of each channel 328. Once the cam surfaces 336 slide out of each channel 328 (i.e., through the exit end), the cam surfaces 336 engage the sloped surface 330. The sloped surfaces 330 are complementary to the slope of the cam surfaces 336 and are configured to guide each cam surface 336 to an adjacent channel 328. The biasing force applied by the biasing member 312 to the second cam member 308 directs each cam surface 336 along the sloped surfaces 330. This in turn rotates the second cam member 308, along with the shaft 272 and associated seal member 216. Once the cam surface 336 reaches the adjacent channel 328, a user can release the compressive pressure applied to the first actuation member 304. The biasing member 312 then applies the biasing force to the second cam member 308, sliding the second cam member 308 along the shaft 272 towards the first actuation member 304. The cam surfaces 336 responsively slide within the adjacent channel 328 towards the first actuation member 304, directing both the cam surfaces 336 and raised projections 324 in each channel 328 towards an end of the channel opposite the exit. This completes one rotational cycle of the actuation assembly 220, which rotates the seal member 216 from one seal configuration to an adjacent seal configuration. In the illustrated embodiment, the seal member 216 and associated shaft 272 is configured to rotate approximately 120° to orient a selected (or desired) seal configuration into fluid communication with the connectors 262 of the valve body 208. It should be appreciated that the actuation assembly can be configured to rotate fewer degrees to account for additional seal configurations position on the seal member 216.

Figure 16:
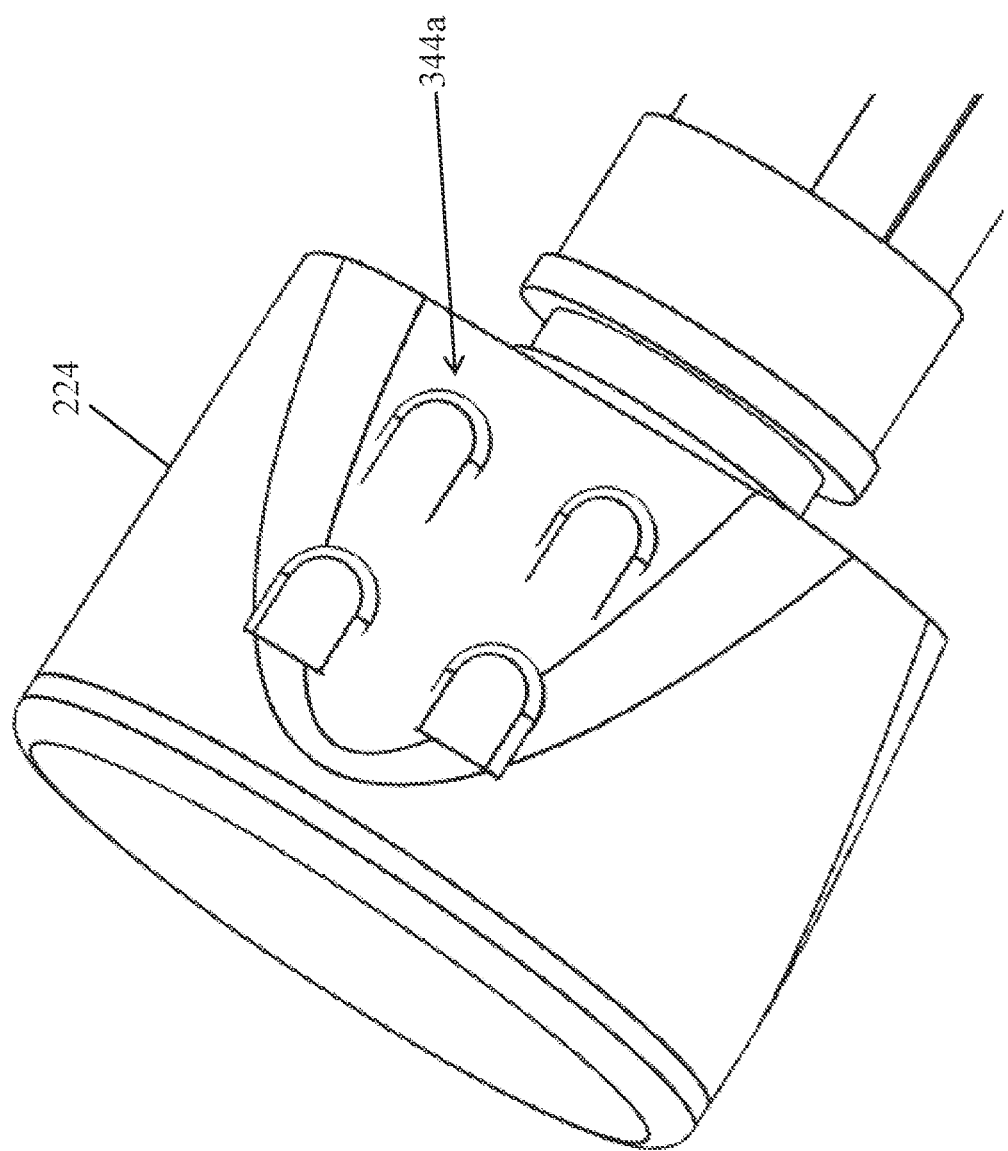
FIG. 16 is a perspective view of an indicator member of the control assembly of FIG. 8, illustrating a first indicia associated with a first seal configuration.
Figure 17:
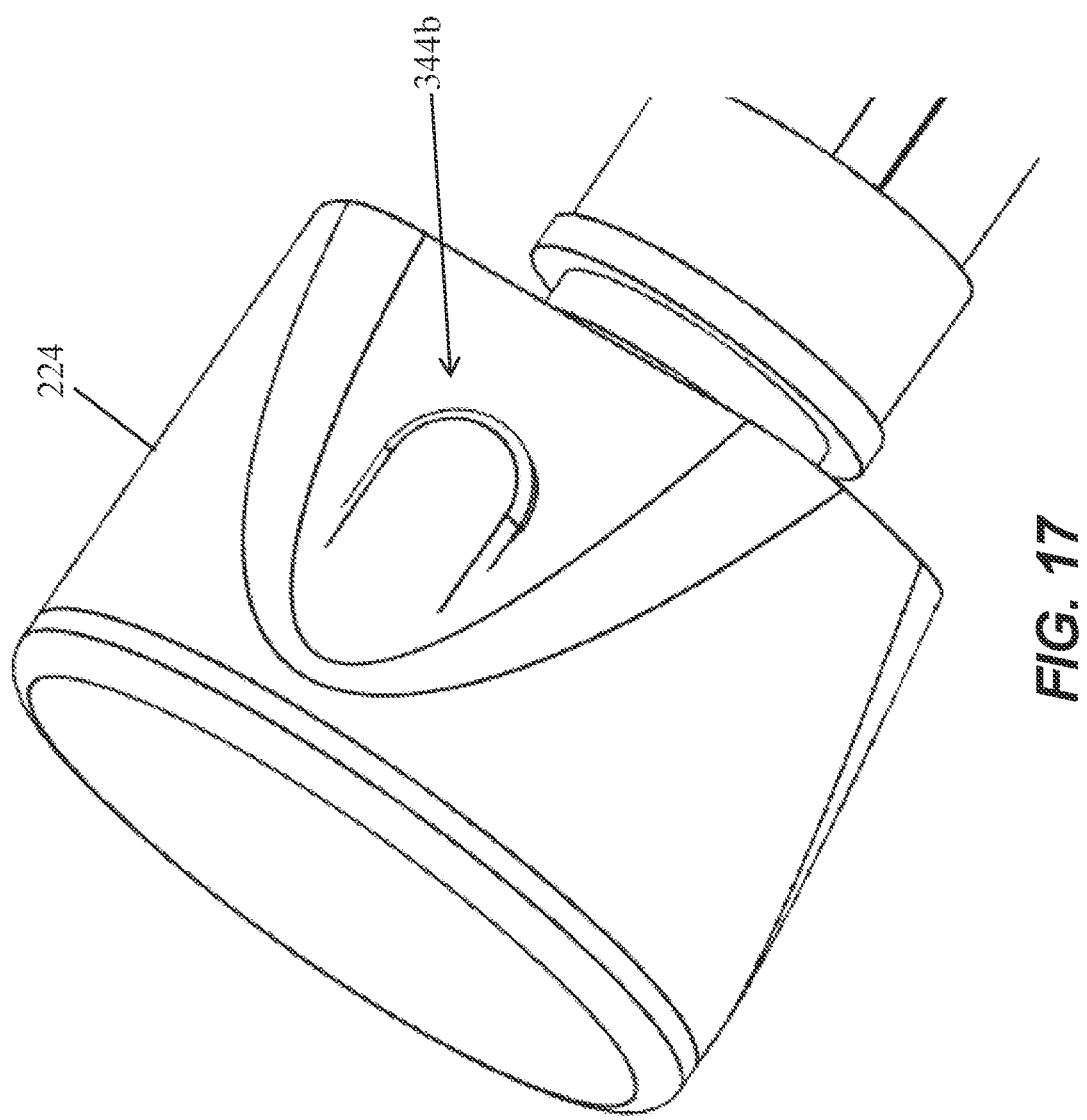
FIG. 17 is a perspective view of the indicator member of the control assembly of FIG. 8, illustrating a second indicia associated with a second seal configuration.
Figure 18:
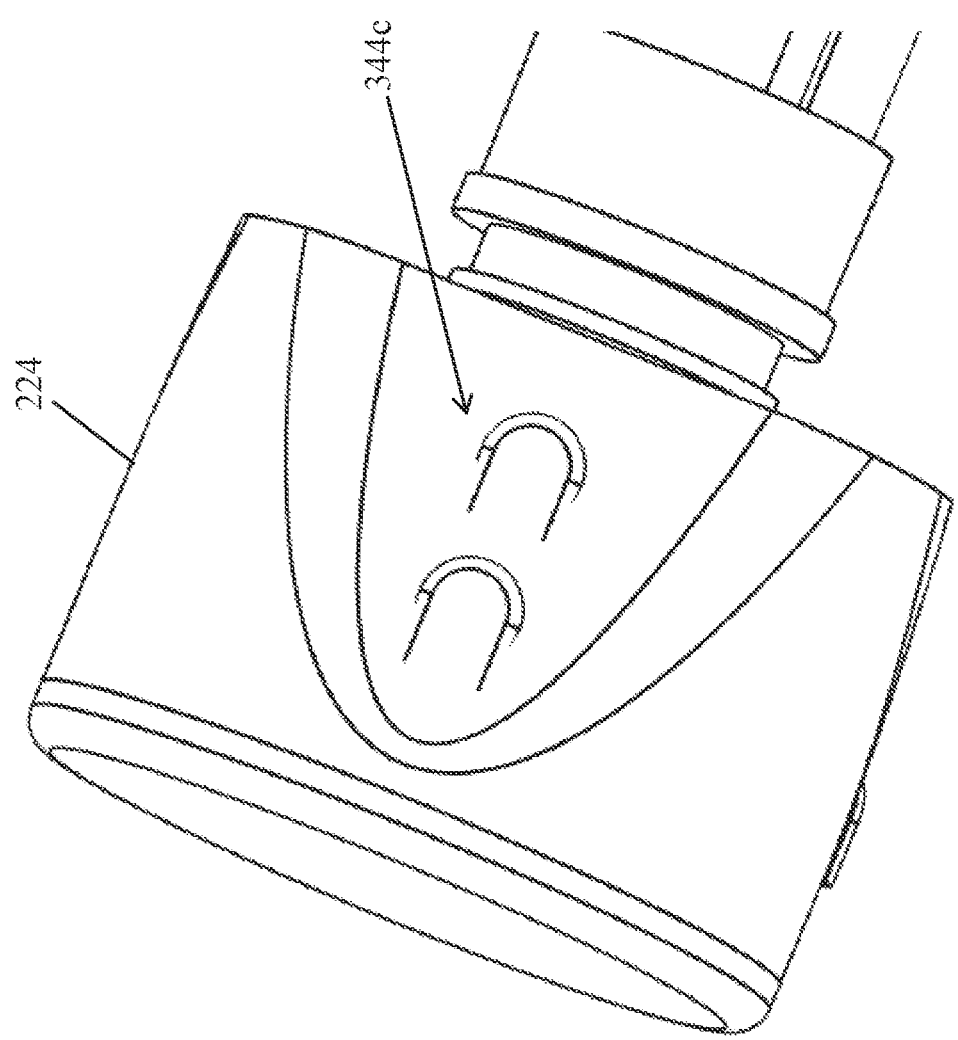
FIG. 18 is a perspective view of the indicator member of the control assembly of FIG. 8, illustrating a third indicia associated with a third seal configuration.

Referring back to FIGS. 8-9 the indicator member 224 is coupled to the control assembly 212. More specifically, the indicator member 224 is coupled to the seal member 216 at an end opposite the actuation assembly 220. The indicator member 224 is configured to rotate with the seal member 216 to provide a user a visual indication of the selected seal configurations 278, 286, 290. Accordingly, the indicator member 224 includes a plurality of indicia 344 representative of the selected seal configuration 278, 286, 290. In the illustrated embodiment, the indicator member 224 is coupled to the shaft 272 at an end opposite the actuation assembly 220. The indicator member 224 is thus configured to rotate in response to rotation of the shaft 272. Further, the indicator member 224 is configured to rotate with the shaft 272. FIG. 16 illustrates a first indicia 344a associated with the first seal configuration 278. The first indicia 344a is depicted as four raised projections representative of the four fluidly isolated inflation zones 30, 34, 38, 42. FIG. 17 illustrates a second indicia 344b associated with the second seal configuration 286. The second indicia 344b is depicted as a single raised projection representative of all four of the inflation zones 30, 34, 38, 42 being fluidly connected. FIG. 18 illustrates a third indicia 344c associated with the third seal configuration 290. The third indicia 344c is depicted as a pair (or two) raised projection representative of two pair of inflation zones being connected together (e.g., the first pair of inflation zones 30, 38 being fluidly connected and the second pair of inflation zones 34, 42 being fluidly connected). The indicia 344a-c are generally rotationally offset from the associated seal configuration 278, 286, 290. More specifically, each indicia 344a-c is rotationally offset approximately 90° from the associated seal configuration 278, 286, 290 relative to the seal member 216 (or rotated approximately 90° relative to the first axis Ai). This allows the selective seal configuration 278, 286, 290 to be in fluid communication with the connectors 262 (and associated fluid conduits 54, 58, 62, 66 of the related inflation zones 30, 34, 38, 42), while also providing user access to easily view the associated indicia 344a-c of the selective seal configuration 278, 286, 290 on the indicator member 224. Notably, since the connectors 262 are generally parallel to the base 14 and the selected seal configuration 278, 286, 290 is generally aligned with the connectors 262, it is necessary to rotationally offset the indicia 344a-c relative to the associated seal configuration 278, 286, 290 to provide ease for use. It should be appreciated that in other examples of embodiments, the specific indicia 344 can be any suitable indicator that indicated to a user the selected seal configuration 278, 286, 290.

In operation of the multi-position airflow control assembly 200, actuation of the actuation assembly 220, as described above, is configured to selectively rotate the seal assembly 216 relative to the valve body 208. As the seal assembly 216 rotates, one of the plurality of seal configurations 278, 286, 290 is placed into fluid communication with the connectors 262. This in turn places the one of the plurality of seal configurations 278, 286, 290 into fluid engagement with the fluid conduits 54, 58, 62, 66 of each associated inflation zone 30, 34, 38, 42. The indicator member 224 rotates with the seal assembly 216 to orient the indicia 344a-c associated with the selected seal configuration 278, 286, 290 to provide an indication to the user of the selected seal configuration 278, 286, 290. Stated another way, the indicia 344a-c associated with the selected seal configuration 278, 286, 290 is exposed (or visible) to a user. Each actuation of the actuation assembly 220 cycles the seal assembly 216 between the plurality of seal configurations 278, 286, 290 (or places each of the plurality of seal configurations 278, 286, 290 into fluid engagement with the fluid conduits 54, 58, 62, 66 of each associated inflation zone 30, 34, 38, 42). Rotation of the seal assembly 216 is in response to rotation of the shaft 272. Similarly, rotation of the indicator member 224 is in response to rotation of the shaft 272. Rotation of the shaft 272 is in response to actuation of the actuation assembly 220.

One or more aspects of the multi-position airflow control assembly 200 provides certain advantages. For example, the seal assembly 216 includes a plurality of seal configurations 278, 286, 290 that are configured to selectively fluidly connect or fluidly isolate one or more inflation zones 30, 34, 38, 42 of a cellular cushion 10. This provides for improved adjustability and customization for a user. The adjustability and customization can allow the cellular cushion 10 to be optimized to the user, to further reduce a risk of tissue damage and/or pressure sores from extended sitting. These and other advantages are realized by the disclosure provided herein.

What is claimed is:

1. A multi-position airflow control assembly comprising:
a valve housing;
a valve body received by the valve housing;
a plurality of connectors coupled to the valve body, each connector configured to fluidly connect to an inflation zone of a cellular cushion; and
a control assembly partially received by the valve body, the control assembly including:
a seal member, and
an actuation assembly operably connected to the seal member and configured to rotate the seal member relative to the valve body,
wherein the seal member is configured to rotate between at least a first position and a second position,
wherein in response to the first position, the seal member is fluidly connected to the plurality of connectors such that the connectors are fluidly isolated from each other, and
wherein in response to the second position, the seal member is fluidly connected to the plurality of connectors such that the connectors are grouped into a first group of connectors and a second group of connectors, the first group of connectors being fluidly connected, the second group of connectors being fluidly connected, and the first group of connectors being fluidly isolated from the second group of connectors.

2. The multi-position airflow control assembly of claim 1, wherein the seal member is configured to rotate to a third position, wherein in response to the third position, the seal member is fluidly connected to the plurality of connectors such that the connectors are fluidly connected together.

3. The multi-position airflow control assembly of claim 1, wherein the control assembly includes an indicator member configured to rotate with the seal member.

4. The multi-position airflow control assembly of claim 3, wherein the indicator member includes a first indicia associated with the first position of the seal member and a second indicia associated with the second position of the seal member, wherein in response to the first position, the first indicia is exposed, and wherein in response to the second position, the second indicia is exposed.

5. The multi-position airflow control assembly of claim 1, wherein the actuation assembly is configured to rotate the seal member relative to the valve body in response to lateral movement of a portion of the actuation assembly along an axis.

6. The multi-position airflow control assembly of claim 5, wherein the axis is parallel to the seal member.

7. The multi-position airflow control assembly of claim 1, wherein the control assembly includes a shaft, the seal member being carried by the shaft.

8. The multi-position airflow control assembly of claim 7, wherein the actuation assembly is coupled to a first end of the shaft.

9. The multi-position airflow control assembly of claim 8, wherein the control assembly includes an indicator member coupled to a second end of the shaft, opposite the first end.

10. The multi-position airflow control assembly of claim 8, wherein the actuation assembly is configured to rotate the shaft relative to the valve body, and in response the shaft is configured to rotate the seal member relative to the valve body.

11. The multi-position airflow control assembly of claim 10, wherein the actuation assembly is configured to rotate the shaft in response to lateral movement of a portion of the actuation assembly along an axis defined by the shaft.

12. The multi-position airflow control assembly of claim 11, wherein the actuation assembly includes a first actuation member, a second cam member slidably connected to the shaft, and a biasing member configured to apply a biasing force on the second cam member, wherein in response to movement of the first actuation member along the axis, the second cam member slides relative to the shaft along the axis until the biasing force facilitates rotation of the second cam member relative to the first actuation member, wherein in response to rotation of the second cam member, the shaft rotates relative to the valve body.

13. The multi-position airflow control assembly of claim 1, wherein the valve body defines a frustoconical shape, and the seal member defines a complimentary frustoconical shape.

14. The multi-position airflow control assembly of claim 1, wherein the valve housing includes a first portion having a living hinge, and a second portion defining a first end and a second end, the first and second ends configured to selectively fasten.

15. The multi-position airflow control assembly of claim 14, wherein the first portion of the valve housing is configured to receive the valve body.

16. The multi-position airflow control assembly of claim 14, wherein the first end and the second end are configured to engage and retain a portion of a cellular air cushion.

17. The multi-position airflow control assembly of claim 1, wherein the valve housing includes a first housing member and a second housing member, the first and second housing members configured to selectively fasten.

18. The multi-position airflow control assembly of claim 17, wherein the first housing member defines a first portion of a valve body receiving portion, and the second housing member defines a second portion of the valve body receiving portion.

19. The multi-position airflow control assembly of claim 18, wherein the valve body receiving portion is configured to receive the valve body.

20. The multi-position airflow control assembly of claim 17, wherein the first housing member defines a first end, and the second housing member defines a second end, the first and second ends configured to selectively fasten.

\* \* \* \* \*